United States Patent

Estelle et al.

[11] Patent Number: 5,805,348
[45] Date of Patent: Sep. 8, 1998

[54] LENS SYSTEM WITH REDUCED SENSITIVITIES AND A METHOD OF MANUFACTURING

[75] Inventors: Lee R. Estelle; Barbara J. Kouthoofd, both of Rochester, N.Y.

[73] Assignee: Eastman Kodak Company, Rochester, N.Y.

[21] Appl. No.: 695,461

[22] Filed: Aug. 12, 1996

[51] Int. Cl.$^6$ .................................................. G02B 15/15
[52] U.S. Cl. ............................................................ 359/677
[58] Field of Search ................................. 359/677, 676, 359/689, 679

[56] References Cited

U.S. PATENT DOCUMENTS 3,294,471  12/1966  Back ........................................ 359/677
3,848,967  11/1974  Grey ........................................ 359/677

OTHER PUBLICATIONS

"Modern Optical Engineering", The Design of Optical Systems, by Warren J. Smith, McGraw–Hill Book Co., 1966 –pp. 420–427.

"A Tolerancing Procedure Based on MTF", by Matthew P. Rimmer, Optical Research Associates, Pasadena, California, Presented at the SPIE Meeting on Computer–Aided Optical Design, San Diego, California, Aug. 28–29, 1978.

A Reprint from the "Proceedings of SPIE –The International Society for Optical Engineering", vol. 766 Recent Trends in Optical Systems Design; Computer Lens Design Workshop, Jan. 13–15, 1987, Los Angeles, California, A technical overview of Code V, Version 7, by Bruce R, Irving, Optical Research Associates, Pasadena, California.

*Primary Examiner*—Hoa Q. Pham
*Attorney, Agent, or Firm*—Svetlana Z. Short

[57] ABSTRACT

A lens system has nominal focal length and aberrations and includes a plurality of lens components defined by design parameter values and a special airspace distance. The lens system is characterized in design such that manufacturing deviations from the design parameter values cause a variation from the nominal focal length and a variation in at least one of the aberrations. Both of these deviations can be offset simultaneously by a single change in the special airspace distance.

14 Claims, 5 Drawing Sheets

LENS SYSTEM WITH REDUCED SENSITIVITIES AND A METHOD OF MANUFACTURING

FIELD OF THE INVENTION

This invention relates to lens systems having reduced sensitivity to common manufacturing and assembly errors and to a method of manufacturing such lens systems.

DESCRIPTION OF THE PRIOR ART

Many lens system designs are never advanced from the design stage to a finished product. A major reason why a lens system design never leaves the paper solution stage is due to its high manufacturing costs.

The term "optical component" includes cemented lens components, uncemented lens components (also referred to as lens elements), prisms, glass plates, etc. The term "precision" when it is used in describing an optical component means that an optical component has tight manufacturing tolerance (i.e., small margin of error) requirements. The manufacturing tolerance requirements are also referred to as tolerances. Optical components with loose tolerances are easy to manufacture while optical components with very tight tolerances are difficult to manufacture and, thus, are very expensive. W. Smith in his book *"Modern Optical Engineers"* (page 423) tabulates typical tolerances for low cost optical components and typical tolerances for precision optical components.

When tolerance requirements for precision optical components challenge the state of art capability of the manufacturing facility, many optical components need to be made in order to get a few optical components complying with tolerance requirements. Those optical components that are manufactured with manufacturing deviations exceeding the tolerance requirements are usually discarded. The low yields further increase manufacturing costs. If the optical components become too expensive to manufacture, a lens system requiring the use of such components may never be made.

It is very difficult to manufacture a lens system of excellent quality for applications requiring both an exact magnification and an object to image distance that cannot be changed. A lens system design for such applications usually requires that the optical components be made to comply with very tight tolerance requirements.

The object to image distance OI for a thin lens model of a lens system providing some magnification m is defined by:

$$OI=EF(m+1/m+2)$$

where EF is the focal length of the lens system.

It can be seen from the above equation that if both the object to image distance, OI, and the magnification, m, have fixed, predetermined values, then the value for the focal length is also fixed. In order to keep the focal length of a manufactured lens system from departing from its design value, the lens system parameters (such as radii of curvature, thicknesses and indices of refraction) must be made to tight tolerance requirements. Thus, manufacturing costs of the lens system requiring an exact magnification over a fixed object-to-image distance tend to be high. (If the object-to-image distance does not have to be exact, then the lens system focal length can be changed by a reasonable value A (typically this value Δ is between one to three percent of the design focal length) to achieve the required magnification. Hence the radii, thicknesses and indices of refraction in such a lens system will have looser tolerance requirements.)

As an alternative to manufacture of high cost, high precision optical components the following procedure is sometimes used during an assembly of a lens system.

The indices of refraction of the lens elements can be removed as contributors to the tolerancing by "melt adjusting". That is, the lens system is redesigned using the known melt data of the glass that will be used in the actual lens system and a "new" lens system design is issued. In addition, thicknesses of cemented doublets or lens elements in close proximity can be "matched", if necessary, to control their net contribution to focal length (or to some aberration). "Matching" means that the thicknesses of all such lens elements need to be measured, and the lens elements that have an actual thickness which is thicker than its design thickness are paired with the lens elements that have an actual thickness which is thinner than its design thickness, so that the overall thickness of the two lens elements is close to the designed value. This procedure is expensive. This procedure may be carried one step further when each one of the manufactured lens elements (i.e., its radii and thickness) is accurately measured and the measured data replaces the design data. The performance of the resultant lens system design is then evaluated and the lens system design is re-optimized to adjust the distances between various optical components. This procedure involves increased labor costs because of the need to measure, store and inventory the optical components and the need to re-optimize the lens system design for every one of the lens system assemblies. This procedure is used on lens systems that are part of an expensive apparatus or when only a few of such lens systems need to be manufactured.

Hence, there exists a constant need to design lens systems that can be manufactured easily and inexpensively. An optical designer needs to design lens systems that do not have overly tight tolerance requirements. That is, a lens system should be designed with manufacturable tolerances.

Therefore, an optical designer needs to find methods to reduce the sensitivities of the optical components to manufacturing and assembly deviations (from the design values). Such deviations include deviation in radii of curvature or thickness in lens components from the design specified values, or displacements of lens components as well as other optical components from their required locations.

SUMMARY OF THE INVENTION

According to the present invention a lens system has nominal focal length and aberrations. The lens system includes a plurality of lens components defined by design parameter values and a special airspace distance. The lens system is characterized in design such that manufacturing deviations from the design parameter values cause a variation from the nominal focal length and a variation in at least one of the aberrations. Both of these deviations can be offset simultaneously by a single change in the special airspace distance.

According to an embodiment of the present invention a method of manufacturing a lens system according to a lens system design having design (i) focal length, (ii) radii, (iii) thicknesses and (iv) distances between lens components comprises the following steps:

(a) Providing a plurality of lens components. Each of the lens components has radii of curvature that deviate more than 3 rings of power from the design radii and a thickness that deviates more than 0.05 mm from the design thickness.

(b) Assembling the lens components into a lens system with the lens components separated by distances that deviate more than 0.05 mm from the design distances, such that (i) the focal length of the lens system differs from the design focal length and, (ii) a majority of the deviations from the design radii, thicknesses and distances introduce an aberration that predominates over any other aberration in the lens system and reduction in deviations tends to minimize the predominate aberration.

(c) Determining the difference between the focal length of the lens system and the design focal length.

(d) Adjusting the position of assembled lens components to change one of the distances to modify focal length of the lens system to be approximately within 1% of the design focal length and to introduce an aberration of an appropriate sign and value to compensate for the predominate aberration.

Also, according to an embodiment of the present invention a lens system is manufactured according to a lens system design having design (i) focal length, (ii) radii, (iii) thicknesses and (iv) distances between lens components. This lens system comprises a plurality of lens components. Each of these lens components have radii of curvature that deviate more than 3 rings of power from the design radii and a thickness that deviates less than 0.05 mm from the design thickness. These lens components are separated by distances that deviate more than 0.05 mm from the design distances. The focal length of the lens system differs from the design focal length and, a majority of the deviations from the design radii, thicknesses and distances introduces an aberration that predominates any other aberration in the lens system and so that reduction in deviations tends to minimize the predominate aberration. The lens system has a compensatory distance. The compensatory distance is one of the distances between the lens components. The focal length is sensitive to changes to the compensatory distance. The compensatory distance is changeable from its nominal design value during assembly to modify focal length of the lens system assembly to be approximately within 1% of the design focal length and to introduce an aberration of an appropriate sign and value to compensate for the predominate aberration.

ADVANTAGES

The invention is directed to an improved lens system and to a method of manufacturing such a lens system.

This method alleviates the necessity to precisely control the focal length of a manufactured lens system via tight tolerance requirements. This reduces labor costs associated with the focal length control. In addition, by controlling aberrations, this method results in a majority of the lens system's parameters exhibiting increased tolerances to manufacturing deviations. This further enhances manufacturability of the lens system.

This method is especially advantageous in making lens systems for applications requiring an exact magnification over a fixed object to image distance. More specifically, lens systems for printers, copiers, microfilm lenses as well as any dual lens systems where both focal lengths have to be the identical would benefit from the present invention.

DESCRIPTION OF THE PREFERRED EMBODIMENT

Figure 1:
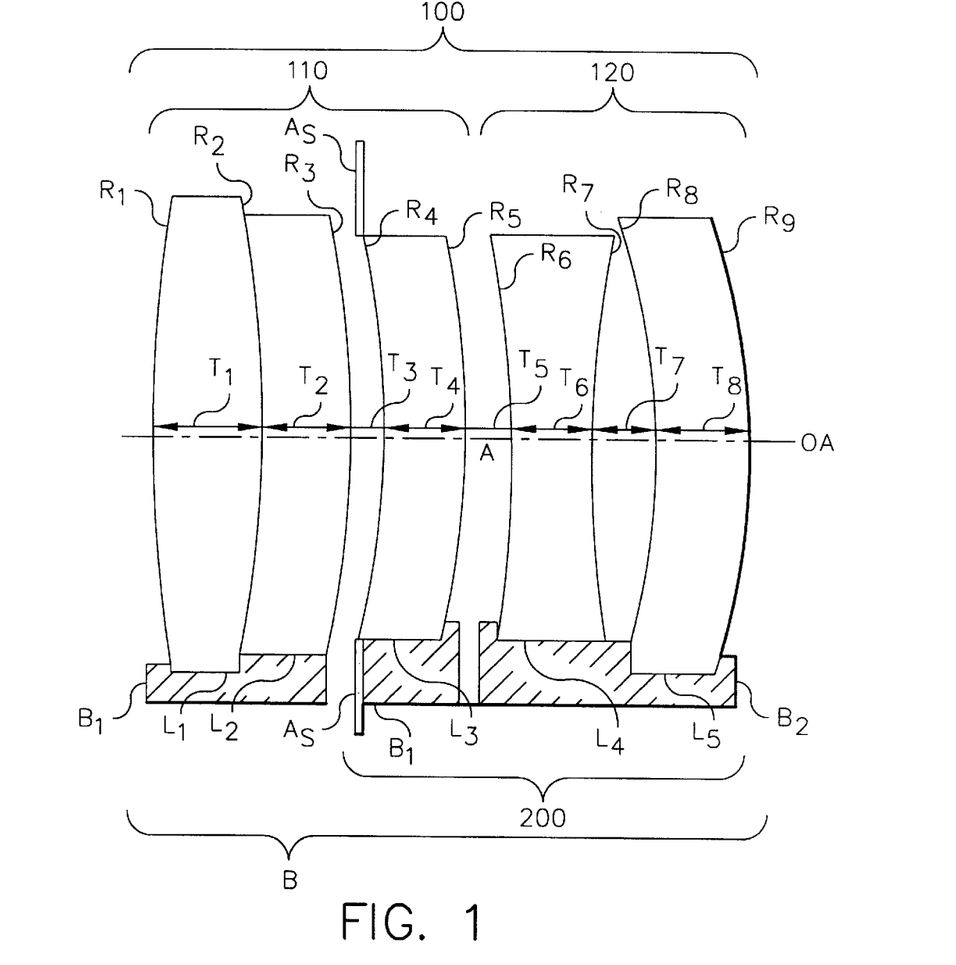
FIG. 1 is a side view of a illustrative lens system 100.
Figure 1A:
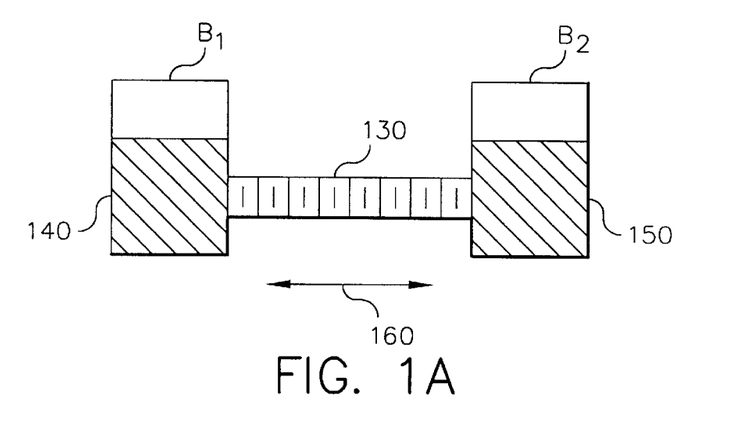
FIG. 1A is a schematic view of an adjuster 200 present in a lens system support structure of the illustrative lens system 100.

FIG. 1 illustrates a preferred embodiment of the present invention in a form of a lens system 100. This lens system includes a plurality of lens components that are airspaced from one another by the appropriate distances. One of these distances is the special airspace distance A. This special airspace distance is a compensatory distance. The compensatory distance A is alterable during the assembly of the lens system 100 by an adjuster 200 present in a lens system support structure or lens system barrel B. The lens system 100 comprises two lens component sections 110 and 120. In the illustrative embodiment of the invention the lens barrel B also includes two section $B_1$ and $B_2$. The lens component section 110 is held by the lens barrel section $B_1$ and the lens component section 120 is held by the lens barrel section $B_2$. The adjuster 200 is illustrated in FIG. 1 A and includes a threaded rod 130. The threaded rod is rigidly fixed to a first block 140. A second block 150 is reciprocally threaded to travel along the treaded rod 130. The barrel section B1 is mounted on the first block 140 and the barrel section B2 is mounted on the second block 150. The adjustable space between the two blocks 140 and 150 is indicated by an arrow 160. The adjuster 200 can be any of a variety of devices for positioning two barrel sections with respect to one another, for example shims, spacers, and screws. When the compensatory distance A is altered, the change in this compensatory distance corrects for the focal length departure from its design value.

This focal length departure is introduced by the deviations of the (manufactured) lens system's parameters from their design values. These parameters include: radii of curvature of lens elements, lens elements thicknesses, indices of refraction and distances between lens components. When the compensatory distance A is altered to correct the focal length departure introduced by the parameter deviations, the alteration also (at least partially) corrects their contribution to the image quality deterioration. The extent of the ability to correct the introduced aberrations is determined by the image quality criteria for the manufactured lens system. That is, the change in the compensatory distance A not only moves the focal length in the right direction, but also introduces compensatory aberrations of the appropriate sign into the lens system. The compensatory aberrations compensate for the aberrations introduced by manufacturing or assembly deviations from the design values in the majority of parameters of the lens system. The term "majority of parameters" is defined herein as more than 60% of the parameters. It is preferred that more than 70% and even more preferred that more than 80% of the parameter deviations be compensated for in this manner.

Lens System Example

Lens system 100 comprises five lens components $L_1$–$L_5$ and an aperture stop AS. The specific parameters for the lens system 100 are provided in Table 1A. In the tables and the drawings, the surfaces have radii R which are numbered by subscripts from the front (also referred to as the object side) of the lens system to the rear (also referenced as an image side) of the lens system. The distances t along an optical axis OA corresponding to either the thicknesses of the lens elements or the spacings between the lens components are also numbered from front to rear. In the tables, spaces and thicknesses are listed on the same line as the surface preceding the space or thickness, as the case may be. All indices N are for the mercury e line of the spectrum at a wavelength $\lambda_e$ of 546.1 nm. The symbol $\nu$ stands for the abbe number for the lens material. All linear dimensions in this specification are in millimeters (mm) unless specified otherwise. Distance $t_5$ is the compensatory distance A. Table 1B provides the values for the compensatory distance A of the lens system 100. Other characteristics of the lens system 100 are provided in Table 1B–1E.

Figure 2A:
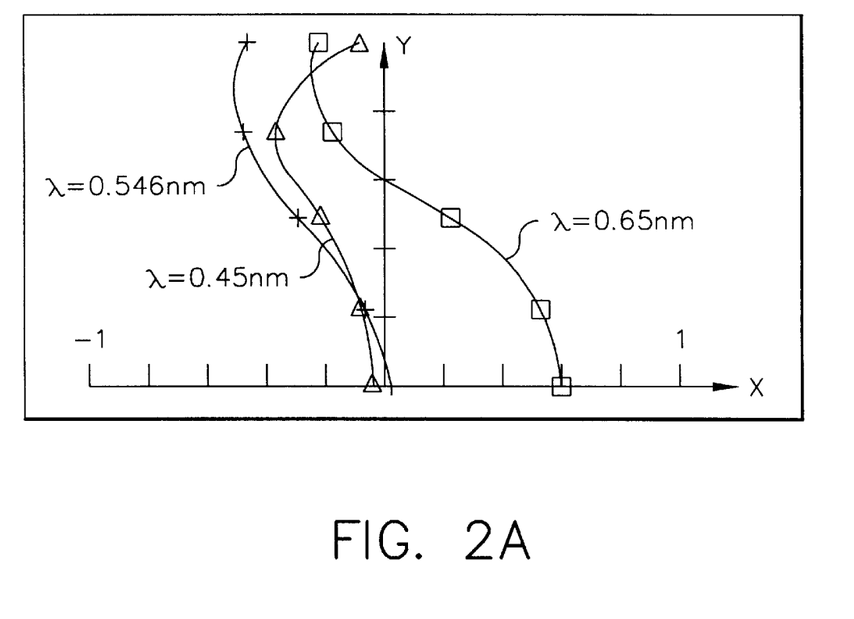
FIGS. 2A–2D show aberrational characteristics of a lens system 100 illustrated in FIG. 1.
Figure 2B:
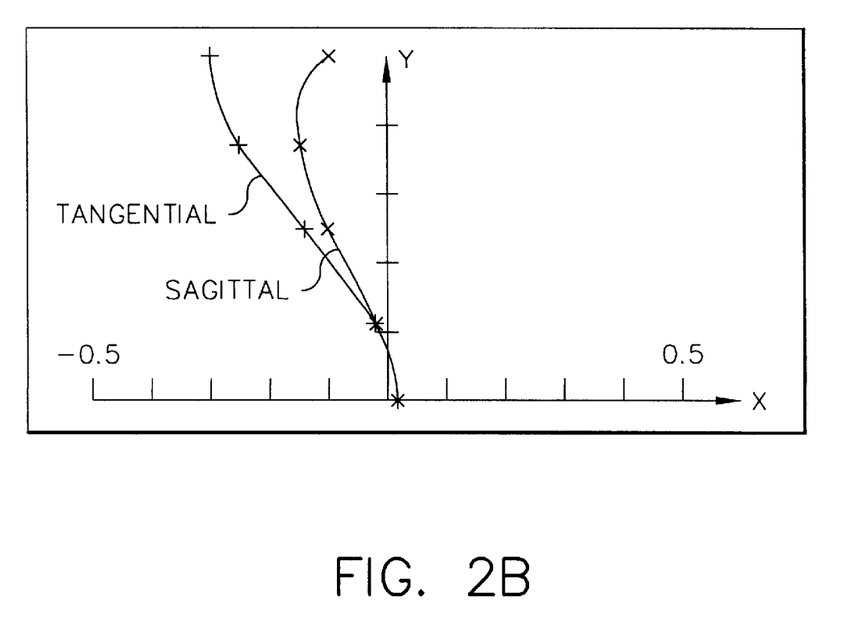
Figure 2C:
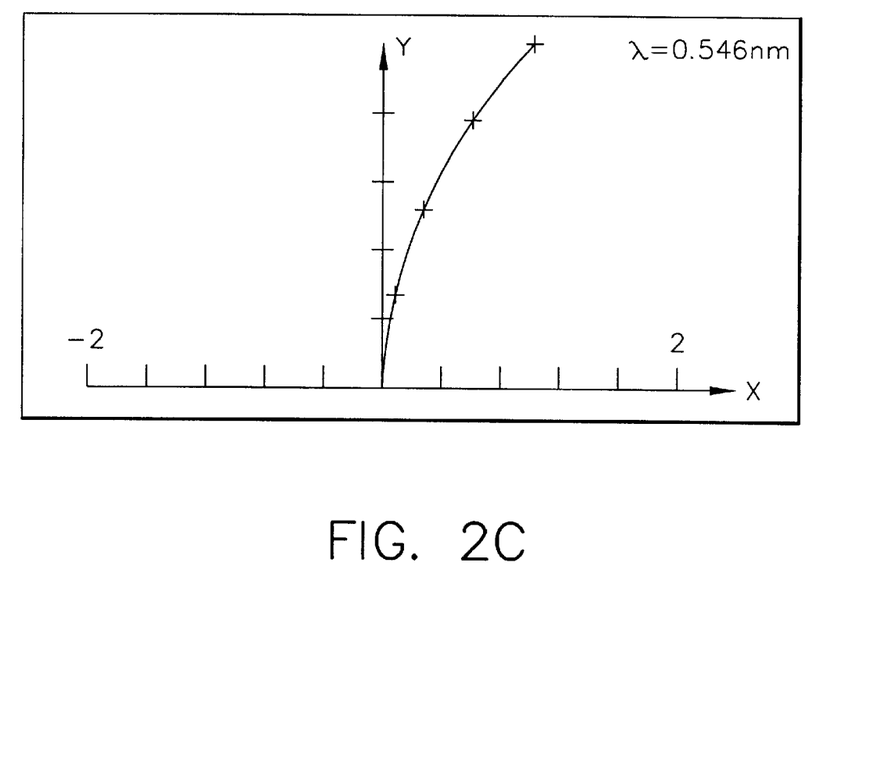
Figure 2D:
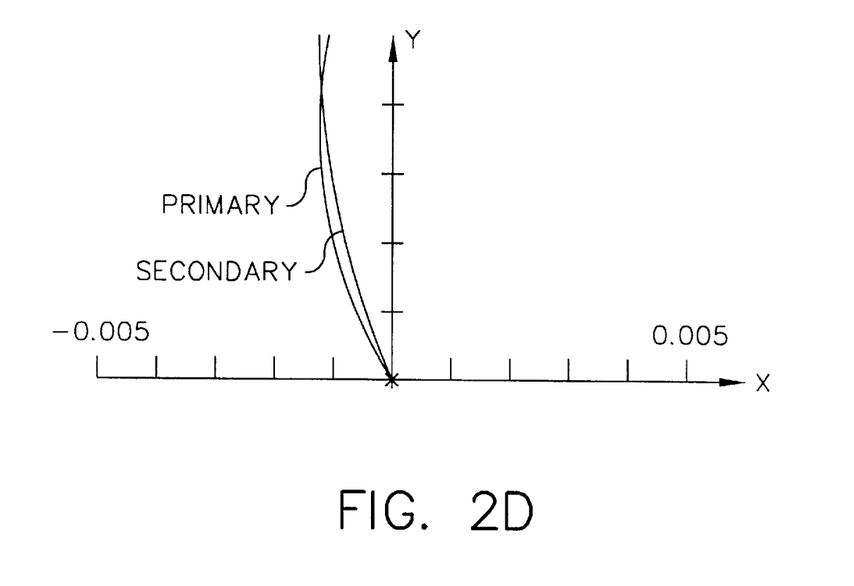

FIGS. 2A–2D detail the performance of lens system 100. Included are ray traces for the various field positions as well as field curvature, distortion and lateral color plots. More specifically, FIG. 2A provides longitudinal spherical aberration plots for the lens system 100, with the y axis being relative aperture and the x axis being spherical aberration in mm. FIGS. 2B–2D represent Astigmatism, Distortion and Lateral color. The vertical (y) axis represents relative field of view (y=1.0 being 16 degrees). The horizonal (x) axis measures longitudinal (along the axis) aberrations. The units of measurement are millimeters.

Figure 3A:
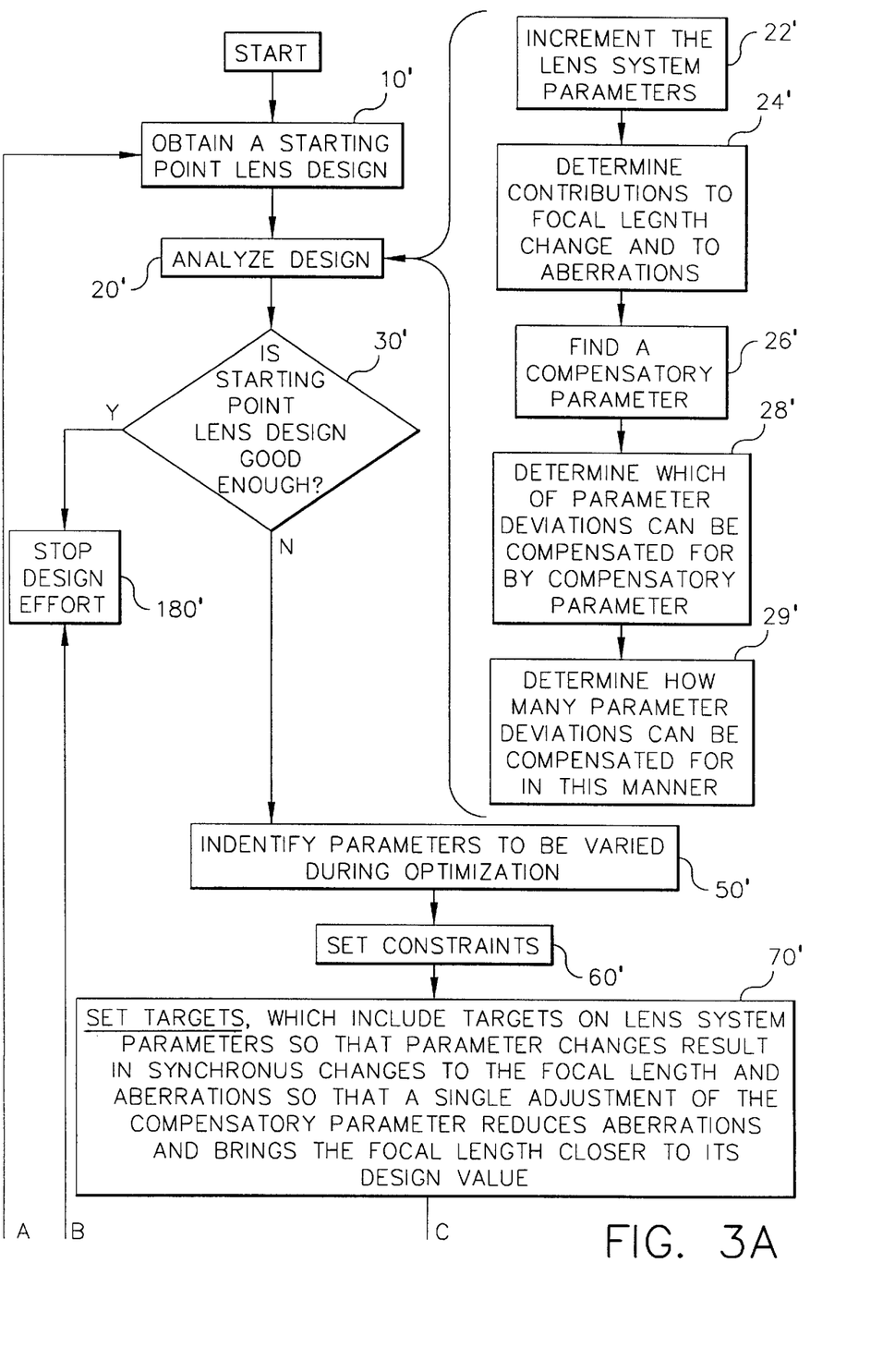
FIGS. 3A–3B show a flowchart of a design process according to a preferred illustrative embodiment of the invention.
Figure 3B:
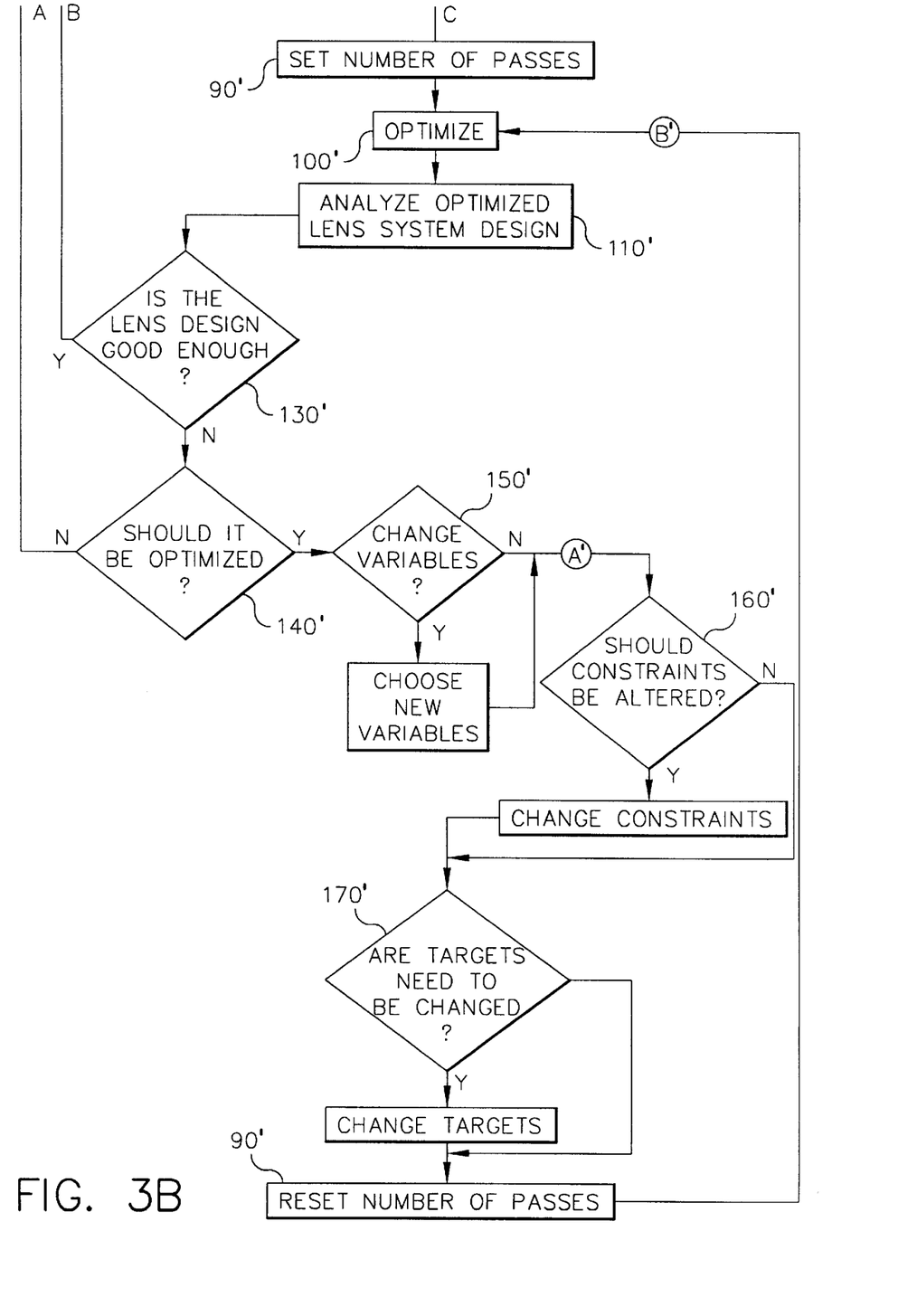

FIGS. 3A–3B illustrate the design process used in designing the lens system 100. This design process is described in detail in the "Lens system design method" section of the specification.

TABLE 1A

| Surface | Clear Aper. | Axial Beam | Radius | Distance | Index | $\nu$-number | Material |
|---|---|---|---|---|---|---|---|
| 1 | 14.60 | 13.18 | 35.9072 | 3.000 | 1.691 | 54.7 | LAK9 |
| 2 | 13.85 | 12.94 | −35.9072 | 2.000 | 1.847 | 23.8 | SF57 |
| 3 | 13.18 | 12.75 | −43.7234 | 0.306 | | | |
| | 12.42 | 12.42 | Diaphragm | 0.800 | | | |
| 4 | 12.41 | 12.35 | −29.5881 | 2.501 | 1.713 | 53.8 | LAK8 |
| 5 | 12.85 | 12.19 | −33.8587 | A | | | |
| 6 | 12.86 | 12.00 | −32.9150 | 1.729 | 1.532 | 48.8 | LLF6 |
| 7 | 13.41 | 11.69 | 32.9150 | 2.000 | | | |
| 8 | 13.59 | 11.70 | −22.8657 | 2.500 | 1.713 | 53.8 | LAK8 |
| 9 | 14.92 | 12.23 | −19.6416 | | | | |

The object-to-image distance of the lens system 100 is held constant. The change in the compensatory airspace distance A changes the focal length and the magnification of the lens system 100 as tabulated below. Other characteristics of the lens system are also provided below.

TABLE 1B

| A | 1/MAG | EF | BF | FF | Image Height | Stop Diam. |
|---|---|---|---|---|---|---|
| 0.649 | 2.076 | 125.50 | 111.54 | 128.16 | 53.5 | 12.26 |
| 1.300 | 2.415 | 118.54 | 102.58 | 122.75 | 46.1 | 11.62 |
| 0.853 | 2.189 | 123.23 | 108.62 | 126.40 | 50.8 | 12.05 |
| 0.500 | 1.988 | 127.22 | 113.75 | 129.49 | 55.9 | 12.42 |
| 0.070 | 1.740 | 132.43 | 120.45 | 133.54 | 63.7 | 12.89 |

TABLE 1C

| A | 1/MAG | Relative Aperture | Effective Aperture | Lens system Length | Relative Illum. |
|---|---|---|---|---|---|
| 0.649 | 2.076 | 9.73 | 14.42 | 15.485 | 0.79 |
| 1.300 | 2.415 | 9.73 | 13.76 | 16.136 | 0.85 |
| 0.853 | 2.189 | 9.73 | 14.17 | 15.689 | 0.82 |
| 0.500 | 1.988 | 9.73 | 14.62 | 15.336 | 0.77 |

TABLE 1C-continued

| A | 1/MAG | Relative Aperture | Effective Aperture | Lens system Length | Relative Illum. |
|---|---|---|---|---|---|
| 0.070 | 1.740 | 9.73 | 15.32 | 14.906 | 0.70 |

TABLE 1D

| A | 1/MAG | Object Distance | Paraxial Image Distance |
|---|---|---|---|
| 0.649 | 2.076 | −388.68 | 172.01 |
| 1.300 | 2.415 | −409.00 | 151.66 |
| 0.853 | 2.189 | −396.21 | 164.91 |
| 0.500 | 1.988 | −382.37 | 177.75 |
| 0.070 | 1.740 | −363.99 | 196.56 |

The analysis of the lens system 100 indicated that astigmatism reduces the image quality below requirements at the magnification extremes. However, the majority of the parameter deviations affect astigmatism similarly. The required change to the airspace distance A will minimize the aberrations and will bring the lens system image quality to the required level.

In the above tables 1A–1D, the term EF stands for the focal length of the lens system 100, BF is the back focal length, FF is the front focal distance.

The nominal lens system 100 has a focal length of 125.5 mm and an object to image distance of 575.9 mm. The lens system 100 provides a 2× magnification and accepts a half field angle of 16 degrees. It is achromatized for 450–650 nm range with a principal wavelength being 546 nm. Because this particular lens system embodiment is intended for use in a cluster printer, its magnification has to be exact, and its object to image distance and its focal length have to be very close to their design specified values. This means that tolerances on the focal length and on the object-to-image distance are very tight.

The MTF responses of this lens system 100 at the frequency of 11 lines per millimeter are provided in Table 1E. The MTF responses tabulated in Table 1E are computed for the wavelengths 650, 546.1 and 450 with weights 0.35, 0.5, and 0.15 respectively.

TABLE 1E

| | | | Sagittal/Tangential | | | |
|---|---|---|---|---|---|---|
| 1/MAG | L/MM | AXIS | 40% | 60% | 75% | 90% |
| 2.076 | 11 | 83 | 83/84 | 84/85 | 85/83 | 82/77 |
| 2.189 | 11 | 81 | 83/83 | 84/82 | 84/76 | 84/63 |
| 1.988 | 11 | 62 | 67/75 | 74/82 | 80/72 | 80/45 |

Below is a Table 2 showing an amount a given design parameter needs to change by to produce a 1 mm change in the focal length EF of the lens system 100. These parameters are radii R(i), distances t along the optical axis which correspond to either lens component thicknesses or airspace distances, and indices N(i). The thickness changes ($\Delta t$) are given in millimeters, radii changes ($\Delta R$) are in rings of power (+ surface is strengthened; − surface is weakened) and index of refraction changes ($\Delta N$) are dimensionless.

TABLE 2

| Radius R | ΔR | Distance t | \|Δt\| | index N | ΔN |
|---|---|---|---|---|---|
| $R_1$ | 7.86 | $t_1$ | 0.474 | N (I) | −0.0012 |
| $R_2$ | 31.85 | $t_2$ | 1.081 | N (II) | 0.0118 |
| $R_3$ | −5.26 | $t_3$ | 0.073 | N (III) | 0.0145 |
| $R_4$ | 6.27 | $t_4$ | 0.354 | N (IV) | 0.0013 |
| $R_5$ | −6.67 | $t_6$ | 0.722 | N (V) | −0.0069 |
| $R_6$ | 9.51 | $t_7$ | 4.082 | | |
| $R_7$ | −10.78 | $t_8$ | 0.124 | | |
| $R_8$ | 8.64 | | | | |
| $R_9$ | −9.77 | | | | |

Table 2 shows that there are a total of 21 parameters that affect the focal length EF (excluding distance $t_5$). As stated above, because in the lens system 100 magnification has to be exact, the object to image distance is fixed. Therefore, the manufactured lens system's focal length EF must also be held very close to its design value. Based on image quality requirements required for the cluster printer application, the lens system 100 can tolerate a change in EF of only 0.33 mm. This focal length tolerance requirement assumes about ½ wave (λ=546.1 nm) of focus variation and a tolerance of 0.5% on magnification control when the lens system is used in the finite conjugates position.

As stated above, Table 2 depicts the amounts of individual parameter deviations, where each parameter change will result in a 1 mm change in the focal length. Since the cumulative effect of these deviations will result in a focal length change which is much larger than 1 mm, the maximum allowed deviations in the radii of curvature, thickness and the lens component separation must be much smaller than the amounts Δ listed in Table 2.

The "Modern Optical Engineering" book also provides a statistical tolerancing method to determine the amount of deviation allowed for each individual parameter. It can be determined from this method that for a lens system with N parameters, and a final tolerance requirement T, the change m(i) in the image quality caused by a deviation in any given parameter from its design value is determined by the following equation:

$$m(i) = T/\sqrt{N}$$

Therefore, if T is the tolerance requirement for the focal length, then T=0.33 mm. Table 2 indicates that we have 21 design parameters. Therefore, N=21. Thus, $m(i)=0.33/\sqrt{21}=0.07$. This means that in order to keep the focal length change Δ to Δ=0.33 mm, no individual parameter of the above 21 parameters can cause the focal length to change by more than 0.07 mm. By scaling all of the values in Table 2 to produce 0.07 mm change (instead of 1 mm change) in the focal length we arrive at Table 3. That is, Table 3 shows an amount that a given design parameter needs to change by in order to produce a 0.07 mm change in the focal length.

TABLE 3

| Radius R | ΔR | Distance t | \|Δt\| | index N | ΔN |
|---|---|---|---|---|---|
| $R_1$ | 0.6 | $t_1$ | 0.03 | N (I) | −0.0001 |
| $R_2$ | 2.2 | $t_2$ | 0.08 | N (II) | 0.0008 |
| $R_3$ | −0.4 | $t_3$ | 0.01 | N (III) | 0.001 |
| $R_4$ | 0.4 | $t_4$ | 0.02 | N (IV) | 0.0001 |
| $R_5$ | −0.5 | $t_6$ | 0.05 | N (V) | −0.0005 |
| $R_6$ | 0.7 | $t_7$ | 0.29 | | |

TABLE 3-continued

| Radius R | ΔR | Distance t | \|Δt\| | index N | ΔN |
|---|---|---|---|---|---|
| $R_7$ | −0.8 | $t_8$ | 0.09 | | |
| $R_8$ | 0.6 | | | | |
| $R_9$ | −0.7 | | | | |

Focal Length Control

Table 3 indicates that in order to keep the focal length change to Δ=0.33 mm or less, very tight tolerancing requirements for the parameter changes must be set. For example, deviation to the radius of curvature on a second surface r(2) must be held to within 2.2 rings of power. The tolerances for other radii of curvature are even tighter. The tolerances for thickness and airspace distance variations are also tight. They range from 0.01 to 0.09 mm in all, but one of the parameters.

It is very difficult to hold thicknesses and airspaces to 0.05 mm and the radii to 2 rings of power. Tolerances such as these are considered extra precise. (See Warren. J. Smith reference discussed in the prior art section.) It can be seen that this lens system would have manufacturing problems if it has to be manufactured with tolerances of Table 3.

However, as stated above, the lens system 100 utilizes a compensatory distance A to achieve relief for the difficult tolerance requirements described above. Table 1B describes the motion that allows the compensatory distance A to adjust for a focal length change that ranges approximately ±3.5 mm from the design focal length value. That is, the lens system 100 was designed with a compensatory distance A that can change the lens system focal length FE by a total of 7.0 mm even though the tolerance on the focal length deviation is 0.33 mm. Thus, even if the focal length of the nominal lens system deviates by about ±3% or about ±3.5 mm, the adjustment in the compensatory distance A will bring it back to the design value. Furthermore, as stated above, this compensatory distance also adjusts for major aberrational degradation produced by the deviations from their design values in a majority of the lens system parameters.

It is known that more commercially acceptable tolerances on thicknesses and radii are 0.25 mm and 10 rings respectively. Therefore, we should strive to achieve these tolerance values for the 21 parameters tabulating in Table 3.

Assuming that the airspace distance A could adjust for any parameter deviation, then the focal length tolerance T is reset to 7.0 mm and the allowable focal length variation introduced by each of the 21 parameters would be (7.0/0.33) times larger than the one specified in Table 3. Thus m(i)= 0.07×(7.0/0.33)=1.49. Therefore, Table 4 shows an amount a given design parameter needs to change by in order to produce a 1.49 mm change in the focal length. It is noted that although each of the parameter change shown in Table 4 produces a 1.49 mm change in the lens system focal length, the compensatory distance A can be adjusted to return the focal length back to its design value.

Now as seen in the Table 4 below, most of the parameters have very loose tolerances except for $R_3$ and $t_3$ (which are somewhat sensitive to manufacturing and assembly errors). Because all the other tolerances can easily be tighter, the tolerances for the parameters r(3) and t(3) could be loosened.

TABLE 4

| Radius R | Δ R | Thickness t | \|Δ t\| | Index N | Δ N |
|---|---|---|---|---|---|
| $R_1$ | 11.7 | $t_1$ | 0.7 | n (I) | −.0018 |
| $R_2$ | 47.5 | $t_2$ | 1.6 | n (II) | .0176 |
| $R_3$ | −7.8 | $t_3$ | 0.1 | n (III) | .0216 |
| $R_4$ | 9.3 | $t_4$ | 0.5 | n (IV) | .0019 |
| $R_5$ | 9.9 | $t_6$ | 1.1 | n (V) | −.0102 |
| $R_6$ | 14.2 | $t_7$ | 6.1 | | |
| $R_7$ | −16.1 | $t_8$ | 0.2 | | |
| $R_8$ | 12.9 | | | | |
| $R_9$ | −14.6 | | | | |

The procedure described so far in this section of the specification addresses only one defect (albeit a major one)—i.e., the control of the focal length.

Major Aberration Control

The criteria for the image quality, i.e. how the lens system parameter deviations effect the image quality, and whether or not an image quality deterioration can be adjusted and corrected by the compensatory distance A (i.e., $t_5$) is the final consideration in designing the lens system.

The MTF requirement for the lens system design 100 was to maintain 60% response on axis and 50% response in the 0.7 field at 11 lines/mm. The wavelengths are 650 nm, 546.1 nm, and 450 nm with weights of 0.35, 0.5 and 0.15, respectively. As we can see from the Table 1E, the lens system design 100 has responses considerably above the requirement. The on axis MTF value is 0.83 at 11 lines/mm and the minimum MTF value at 0.7 field is 0.77 at 11 lines/mm. Therefore, the deterioration of MTF due to the lens system parameter deviations can be 0.23 on axis and 0.27 in the field.

Because the field of view of the lens system 100 is appreciable, the most predominate aberration that limits the image quality of this lens system (when the lens system parameter values deviate from their design values) is the astigmatism. In other types of lens systems, it may be another aberration, for example spherical aberration or coma. The astigmatism introduced by 15 of the 21 parameters is compensated by adjusting the compensatory distance A. That is, the single change in this compensatory distance not only brings back the focal length, but also corrects for the astigmatism introduced by the majority of the lens system parameter deviations. The object and image distances are also adjusted each time to maintain the original magnification and the overall object to image distance. This way the nodal point separation (i.e. a distance between the nodal points of the lens system) is assured to be compensated.

Below is a table (Table 5) listing the deviations (increments in value) for each of the 21 parameters. These deviations were determined based upon the MTF quality criteria. That is, every time a single parameter was changed by the specified delta amount, the compensatory distance A was adjusted by the amount disclosed in Table 5 (second column) to minimize the effect of that parameter change on the image quality. The resultant MTF values are disclosed in the last two columns of Table 5. The table illustrates that some of the deviations on some of the parameters can be so large that these parameters now represent little manufacturing challenge. For these parameters the increment was stopped short of its maximum. For example, there were 21 rings of power added to the radius of surface two and still the MTF response was virtually unaffected.

TABLE 5

| Parameter and increment | Adjustment to the distance A | Minimum MTF on axis at 11/mm | Minimum MTF 0.7 in field at 11/mm |
|---|---|---|---|
| $t_1$ 0.70 mm | −.107 | .63 | .50 |
| $t_2$ 0.70 | −.027 | .60 | .47 |
| $t_3$ 0.30 | −.371 | .82 | .56 |
| $t_4$ 0.30 | .013 | .72 | .58 |
| $t_6$ 0.70 | .010 | .62 | .57 |
| $t_7$ 0.40 | .023 | .76 | .57 |
| $t_8$ 0.20 | −.153 | .76 | .57 |
| $R_1$ 21 rings | −.218 | .81 | .52 |
| $R_2$ 21 | .070 | .83 | .83 |
| $R_3$ 18 | −.271 | .78 | .59 |
| $R_4$ 25 | −.326 | .62 | .60 |
| $R_5$ 40 | .517 | .71 | .55 |
| $R_6$ 33 | −.262 | .70 | .51 |
| $R_7$ 33 | −.253 | .85 | .51 |
| $R_8$ 17 | −.159 | .74 | .50 |
| $R_9$ 35 | .314 | .60 | .57 |
| n (I) 0.004 | −.288 | .72 | .57 |
| n (II) −0.010 | −.058 | .81 | .76 |
| n (III) −0.010 | −.044 | .82 | .75 |
| n (IV) 0.007 | .480 | .65 | .50 |
| n (V) −0.010 | .130 | .80 | .81 |

Again applying the same statistical tolerancing for the 21 parameters listed above and letting T be 0.27 (T is now the drop in MTF), we arrive at:

$$m(i) = T/\sqrt{N} = 0.27/\sqrt{21} = 0.06$$

This means that if each parameter caused the image quality (MTF) to degrade by 0.06, the overall MTF degradation will be within the specified 0.27 lines/mm. The tolerances of the 21 parameters are provided in Table 6 (under the columns headed "Tolerances with compensation"). These tolerances are considerably more reasonable than those shown in Table 3 and are considered commercially manufacturable.

TABLE 6

| PARAMETER | Tolerances without compensation | Tolerances with compensation (plus quality) | PARAMETER | Tolerances without compensation | Tolerances with compensation (plus quality) |
|---|---|---|---|---|---|
| $R_1$ | 0.6 | 5 | $t_1$ | 0.03 | 0.15 |
| $R_2$ | 2.2 | 5 | $t_2$ | 0.08 | 0.15 |
| $R_3$ | 0.4 | 4 | $t_3$ | 0.01 | 0.07 |
| $R_4$ | 0.4 | 6 | $t_4$ | 0.02 | 0.07 |
| $R_5$ | 0.5 | 9 | $t_6$ | 0.05 | 0.15 |
| $R_6$ | 0.7 | 7 | $t_7$ | 0.29 | 0.09 |
| $R_7$ | 0.8 | 7 | $t_8$ | 0.09 | 0.05 |
| $R_8$ | 0.6 | 4 | | | |
| $R_9$ | 0.7 | 8 | | | |
| n (I) | 0.0001 | 0.0009 | n (III) | 0.001 | 0.0022 |
| n (II) | 0.0008 | 0.0022 | n (IV) | 0.0001 | 0.0015 |
| | | | n (V) | 0.0005 | 0.0022 |

Many advantages can be investigated from this Table. For example, manufacturer's index tolerances of 0.001 are standard, so the reduction of the higher tolerances can be applied to loosen the thickness or radius tolerances. The above Table shows that some of the parameters are so loose that they could be eliminated from the list of tolerance requirements. But even without these added considerations, an heretofore extremely difficult lens manufacturing task becomes quite reasonable.

If a manufactured lens system, according to the present invention, is selected from a plurality of manufactured lens systems, where the plurality of manufactured lens systems is composed of at least 10 lens systems which are identical except for differences due to manufacturing tolerances, it will have the following parameters and characteristic behaviors when analyzed with respect to an "average" lens system having average parameter values.

The plurality of the manufactured lens systems define or have average (i) focal length, (ii) radii of curvature $R_1$–$R_{last}$ corresponding to each radius of curvature in each lens component of the lens system, (iii) thicknesses corresponding to each thickness of each lens component of the lens system and (iv) distances between lens components corresponding to each distance between two consecutive lens components of the lens system. Thus an "average" lens system would then be characterized by the average parameter values. As the number (N) of the lens systems in the plurality of the lens systems increases, the average radii, thicknesses, distances and focal length approach the corresponding design specified parameters for the manufactured lens systems and the "average" lens system becomes a closer approximation of the actual the lens system design.

The average focal length is calculated by summing the focal lengths of the plurality of lens systems and by dividing the resultant sum by the number N of the lens systems present in the plurality of lens systems. The average radii of curvature corresponding to each radius of curvature in each lens component of the lens system is calculated by summing all corresponding radii of curvature $R_i$ for corresponding lens components of all of the plurality of lens systems and by dividing the resultant sum by the number N of the lens systems present in said plurality of lens systems. For example, the average radius of curvature for the front most surface of the lens system is calculated by summing the values for the all of the front most radii of the lens systems $\Sigma R_1$ and dividing that sum by the number N of the lens systems present (where N=10 or more) in said plurality of lens systems. This procedure is repeated to calculate the average value for the second radius of curvature $R_2$, third radius of curvature $R_3$, etc. Similarly, an average thickness for each of the lens components corresponding to the "average" lens system the lens system is calculated. This is done by summing all of the thicknesses corresponding to the i-th thickness in the lens system to arrive at the value $\Sigma t_1$, $\Sigma t_2$, $\Sigma t_3$, $\Sigma t_4$ etc, and by dividing the resultant sum by the number of the lens systems present in the plurality of lens systems. Average distances between lens components are similarly calculated.

The manufactured lens system according to the present invention has a focal length that is within 1% of the average focal length. This lens system is well corrected for aberrations and comprises a plurality of lens components, each of the lens components having (i) radii of curvature with deviations from the average radii and (ii) a thickness with a deviation from the average thickness. The lens components are separated by distances with deviations from the corresponding average distances. More specifically, lens system 100, when manufactured, would have a focal length that is within 1% of the average focal length and would be well corrected for aberrations. It would have a plurality of lens components, each of which has (i) radii of curvature with deviations of more than 3 rings of power from the average radii and (ii) a thickness with a deviation of more than 0.05 mm from the average thickness. The lens components would be separated by distances with deviations of more than 0.05 mm from the corresponding average distances. When at least a compensatory distance (which is one of the distances) is modified to equal the average corresponding distance (1) the focal length of the resultant lens system will differ from the average focal length by more than 1%, and (2) a majority of the deviations from the average radii, thicknesses and distances will introduce a large amount of aberration that predominates over any other aberration in the lens system such that reduction in these deviations tends to minimize said predominate aberration. That is, when a compensatory distance is changed to equal the average corresponding distance, the focal length and the aberrations of the resultant lens system degenerate instead of getting better.

Lens System Design Method

The lens system 100 was designed by the new lens system design process which is illustrated in FIGS. 3A–3B. Many of the process steps described below are performed by the lens designer but may be automated. The lens designer utilizes a lens design program having means for analyzing and optimizing a lens system design. More specifically, a commercially available lens design program such as OSLO from Sinclair Optics, Rochester, N.Y., can be utilized by a lens designer in designing the improved lens systems according to the new lens system design process of FIGS. 3A–3B.

This design process is described below.

First, a starting point lens system design is selected or provided by the lens designer (10'). The starting point lens system design should have a plurality of optical components, at least two of which are separated from one another by a predetermined distance.

Second, the starting point lens system design is analyzed (20') by the lens designer utilizing the lens design program. The analysis includes typical lens system analysis steps as well as tolerance analysis steps 22', 24', 26', 28', and 29', which are described in the analysis portion below.

Next, the lens designer decides (30') on whether or not the starting point lens system design is good enough. If the starting point lens system design is good enough (i.e. if it meets all of the design requirements), no more design effort is required (40'); but if the starting point lens system design is not good enough, it requires optimization (100'). If the starting point lens system design requires further optimization, the lens designer identifies (50') variables such as radii of curvature, thicknesses or distances between lens components by the lens designer and sets the constraints (60') (for example, a constraint on a focal length). Target values for the optimization of aberrations are also set (70') by the lens designer; these targets include a contribution introduced by a specific parameter change to a particular aberration. The number of passes is set (90'), to establish a maximum limit on the number of iterations allowed during optimization.

The departure of all these targets from their design values are squared and summed by the lens design program to form a merit function. With everything defined, optimization (100') is performed next by the lens design program. The merit function value is minimized by this program during the optimization process.

After the end of the optimization process, the lens designer analyzes (110') the optimized lens system design (using steps 22', 24', 26', 28', and 29') and determines (120') as to whether or not more effort will improve the lens system design and whether or not the lens system design is good enough (130'). If the lens system design does not meet the requirements, i.e., it is not good enough, the lens designer decides whether or not to further optimize this lens system design (140'). If the answer is no, the lens designer selects either new starting point lens system design or a drastic variation of the existing lens system design and the design process starts all over again. If the answer is yes, then the lens designer makes several decisions. They are: whether variables can be controlled and whether they need to be changed (150'), whether constraints need to be revised (160') and whether or not targets need to be improved (170'). Next, the number of passes is reset (90'), and the optimization process (100') is repeated. If the lens system design meets requirements; i.e., if it is good enough, the design process is stopped (180').

Analysis

The analysis (20') includes the following steps:

Changing the values of all pertinent parameters by a specified incremental value (22'). This step can be done by the lens design program or by the lens designer.

Determining for each individual parameter change what are its contributions to the focal length change and to aberrations (24'). This step is performed by the lens design program.

Finding a "compensatory" parameter that can be most easily adjusted in assembly environment and by whose change the focal length can be controlled (26'). This step is performed by the lens designer. The compensatory parameter need not to be limited to an airspace between two lens components. For example if a liquid lens element with (pressure driven) changeable radii and thickness is present in a lens system, then either one of the radii of curvature or the changeable thickness may be used as a compensatory parameter.

Determining which of the individual parameter deviations can be compensated for (in both aberrational sense and focal length sense) by the adjustment in the value of this compensating parameter (28'). This step is performed by changing the value of the compensatory parameter in response to the changes in values of other parameters (such as the changes performed in step (22')) and by analyzing results.

Determining how many of these parameter deviations (i.e., what percentage) can be compensated for in this manner (29').

The goal is to compensate a given lens system assembly for most of the individual parameter deviations by a single adjustment of the compensating parameter. That is, both the focal length change and the aberrations introduced by most of parameter deviations would be compensated for and returned back to their design specified values by a single change of the compensatory parameter. Usually, but not always, this compensatory parameter is an airspace distance between two lens components. The compensatory distance A of the lens system 100 is an example of such a compensatory distance. If a majority of parameter deviations will be compensated for in such manner, fairly loose tolerance requirements may be set on most, and may be all, lens system parameters.

Optimization

If the percentage of parameter deviations that can be compensated by an adjustment of the compensatory parameter is low, then the lens system design needs to be optimized (100'), or re-optimized, to increase this percentage. The goal is to increase the number of parameters that will behave in the following fashion: When a given amount of a parameter deviation introduces a contribution to the most objectionable aberration (usually the major aberration) and a corresponding change to focal length, the compensatory parameter adjustment that will bring the focal length to the design value will also reduce this aberration. Usually this aberration is either an astigmatism or a spherical aberration.

To increase the percentage of parameters whose deviations can be compensated by the compensatory parameter the lens designer needs to find at least one parameter that has a potential to behave in the above fashion.

This parameter will then be set by the lens designer as a variable during the optimization and the lens system design will be optimized (this is done by the lens design program) to make this parameter behave as described above. Whether or not a given parameter has this potential is determined by the lens designer by looking for a parameter which introduces the least amount of aberration of a wrong direction when this parameter value deviates from its design value. To state it differently, a parameter that has this potential, when incremented in value, exhibits the least amount of non-synchronous behavior between the focal length change and the aberration introduction, as determined by their relationship to the changes of the compensatory parameter. That one parameter (or more parameters) needs to be individually targeted by the lens designer during the optimization to introduce the aberration of the appropriate direction with the parameter change so that the compensatory parameter can favorably adjust aberrations as it adjusts the lens system focal length back to its design value.

The optimization (100') needs to be repeated until as many of the lens system parameters as possible will behave in the above fashion. The lens system design is complete when no more improvement in aberration control and in maintenance of image quality is possible or when the lens system performance meets the performance requirements.

Compensating Air Space Distance

In designing a lens system with a compensatory airspace distance, (such as the compensatory distance A) a starting point lens system design having a sufficiently large airspace distance needs to be obtained. The changes in this airspace distance must be capable to strongly effect the focal length value. This airspace distance must be sufficiently large so that even when it is adjusted to its required minimum value, the lens components would not interfere with one another.

The invention has been described in detail with particular reference to a preferred embodiment thereof, but it will be understood that variations and modifications can be effected within the spirit and scope of the invention.

What is claimed is:

1. A lens system having nominal focal length and aberrations, said lens system comprising:

a plurality of lens components defined by design parameter values and;

a special airspace distance between two lens components, said lens system being characterized in design such that manufacturing deviations from said design parameter values cause a variation from the nominal focal length and a variation in at least one of the aberrations, both of which have been offset simultaneously by a single change in said special airspace distance.

2. A lens system manufactured according to a lens system design having design (i) focal length, (ii) radii, (iii) thicknesses and (iv) distances between lens components, said lens system comprising:

(a) a plurality of lens components, each of said lens components having (i) radii of curvature that deviate more than 2 rings of power from the design radii and (ii) a thickness that deviates more than 0.05 mm from the design thickness, said lens components being separated by distances that deviate more than about 0.05 mm from the design distances, such that the focal length of the lens system differs from the design focal length and, a majority of the deviations from the design radii, thicknesses and distances introduces an aberration that predominates over any other aberration in the lens system and reduction in deviations tends to minimize said predominate aberration;

(b) said lens system having a compensatory distance, said compensatory distance being one of said distances, said focal length being sensitive to changes to said compensatory distance, said compensatory distance being changeable during assembly to modify focal length of the lens system assembly to be approximately within 1% of the design focal length and to introduce an aberration of an appropriate sign and value to compensate for said predominate aberration.

3. A lens system according to claim 2, wherein said radii of curvature deviate more than 3 rings of power from the design radii.

4. A lens system according to claim 2, wherein said radii of curvature deviate more than 4 rings of power from the design radii.

5. A lens system manufactured according to a lens system design having design (i) focal length, (ii) radii, (iii) thicknesses and (iv) distances between lens components, said lens system comprising:

(a) a plurality of lens components, each of said lens components having (i) radii of curvature that deviate from the design radii and (ii) a thickness that deviates from the design thickness, said lens components being separated by distances that deviate from the design distances, such that the focal length of the lens system differs from the design focal length and, a majority of the deviations from the design radii, thicknesses and distances introduces an aberration that predominates any other aberration in the lens system and so that reduction in deviations tends to minimize said predominate aberration;

(b) said lens system having a compensatory distance, said compensatory distance being one of said distances, said focal length being sensitive to changes to said compensatory distance, said compensatory distance being changeable during assembly to modify focal length of the lens system assembly to be approximately within 1% of the design focal length and to introduce an aberration of an appropriate sign and value to compensate for said predominate aberration.

6. A lens system according to claim 5 further having design radii, indices, thicknesses, and distances between lens components which are as follows:

| Surface | Radius | Distance | Index | υ-number |
|---|---|---|---|---|
| 1 | 35.9072 | 3.000 | 1.691 | 54.7 |
| 2 | -35.9072 | 2.000 | 1.847 | 23.8 |
| 3 | -43.7234 | 0.306 | | |
| | Diaphragm | 0.800 | | |
| 4 | -29.5881 | 2.501 | 1.713 | 53.8 |
| 5 | -33.8587 | A | | |
| 6 | -32.9150 | 1.729 | 1.532 | 48.8 |

-continued

| Surface | Radius | Distance | Index | υ-number |
|---|---|---|---|---|
| 7 | 32.9150 | 2.000 | | |
| 8 | -22.8657 | 2.500 | 1.713 | 53.8 |
| 9 | -19.6416 | | | |

7. A method of manufacturing a lens system according to a lens system design having design (i) focal length, (ii) radii, (iii) thicknesses and (iv) distances between lens components, said method comprising:

(a) providing a plurality of lens components, each of said lens components having (i) radii of curvature that deviate more than 3 rings of power from the design radii and (ii) a thickness that deviates more than 0.05 mm from the design thickness;

(b) assembling the lens components into a lens system with the lens components separated by distances that deviate more than 0.05 mm from the design distances, such that focal length of the lens system differs from the design focal length and, a majority of the deviations from the design radii, thicknesses and distances introduces an aberration that predominates over any other aberration in the lens system and reduction in deviations tends to minimize said predominate aberration;

(c) determining the difference between the focal length of the lens system and the design focal length; and (d) adjusting the position of assembled lens components to change one of said distances to modify focal length of the lens system assembly to be approximately within 1% of the design focal length and to introduce an aberration of an appropriate sign and value to compensate for said predominate aberration.

8. A method of manufacturing a lens system comprising:

(a) designing a lens system having nominal (i) focal length and (ii) aberrations, said lens system including a plurality of lens components defined by design (i) radii, (ii) thicknesses, (iii) indices of refraction, and distances between the lens components, including a compensatory airspace distance, said designed lens system being such that focal length variation and at least one aberration variation from the nominal focal length and nominal aberrations, introduced in manufacture, can be corrected and offset, respectively, by a single change in said compensatory airspace distance;

(b) providing a plurality of manufactured lens components corresponding to said plurality of lens components of said lens system design, which components have been manufactured with relatively broad manufacturing tolerances;

(c) assembling the manufactured lens components into a lens system;

(d) determining the difference between the focal length of the lens system and the nominal focal length; and (e) adjusting said compensatory airspace to modify focal length of the lens system assembly to be approximately within 1% of the nominal focal length, whereby said special airspace adjustment also offsets the aberration variation due to manufacture.

9. A method of manufacturing a lens system comprising:

(a) providing a lens system design having nominal (i) focal length and (ii) aberrations, said lens system design including:

a plurality of lens components defined by design (i) radii, (ii) thicknesses, (iii) indices of refraction, and distances between the lens components including a compensatory airspace distance, so that variations from the nominal (i) focal length and (ii) aberrations introduced by manufacturing deviations from said design radii, thicknesses and distances can be offset by a single change in said special airspace distance;

(b) providing a plurality of manufactured lens components corresponding to said plurality of lens components of said lens system design, each of said manufactured lens components having (i) radii of curvature that deviate from the design radii and (ii) a thickness that deviates from the design thickness;

(c) assembling the manufactured lens components into a lens system with the manufactured lens components separated by distances that deviate from the design distances, such that
the focal length of the lens system differs from the nominal focal length and,
a majority of the deviations from the design radii, thicknesses and distances introduce an aberration that predominates any and all other aberration or aberrations in the lens system and so that reduction in deviations tends to minimize said predominate aberration;

(d) determining the difference between the focal length of the lens system and the required focal length; and (e) adjusting said special airspace to simultaneously (i) modify focal length of the lens system assembly to be approximately within 1% of the nominal focal length and (ii) to introduce an aberration of an appropriate sign and value to compensate for said predominate aberration.

10. A lens system, selected from a plurality of lens systems, said plurality of lens systems being composed of at least 10 lens systems which are identical except for differences due to manufacturing tolerances, the plurality of said lens systems having average (i) focal length which is calculated by summing the focal lengths of said plurality of lens systems and by dividing the resultant sum by the number of the lens systems present in said plurality of lens systems, (ii) radii of curvature corresponding to each radius of curvature in each lens component of the lens system and calculated by summing all corresponding radii of curvature $R_i$ for corresponding lens components of all of the plurality of lens systems and by dividing the resultant sum by the number of the lens systems present in said plurality of lens systems, (iii) thicknesses corresponding to each thickness of each lens component and calculated by summing all of the thicknesses corresponding to the i-th thickness in the lens system and by dividing the resultant sum by the number of the lens systems present in said plurality of lens systems; (iv) distances between lens components, calculated by summing all of the distances corresponding to the i-th distance in the lens system and by dividing the resultant sum by the number of the lens systems present in said plurality of lens systems;
said lens system having a focal length that is within 1% of said average focal lengths, said lens system being corrected for aberrations, said lens system comprising:
a plurality of lens components, each of said lens components having (i) radii of curvature with deviations from the average radii and (ii) a thickness with deviations from the average thickness,
said lens components being separated by distances with deviations from the corresponding average distances, such that (a) when at least one of said distances is modified to equal the average corresponding distance
(1) the focal length of the lens system differs from the average focal length by more than 1%, and
(2) a majority of the deviations from the average radii, thicknesses and distances introduce a large amount of aberration that predominates over any other aberration in the lens system and reduction in these deviations tends to minimize said predominate aberration.

11. A lens system according to claim 10, wherein each of said lens components have (i) radii of curvature with deviations of more than 3 rings of power from the average radii and (ii) a with deviations of more than 0.05 mm from the average thickness; and
said lens components are separated by distances with deviations of more than 0.05 mm from the corresponding average distances.

12. A method of manufacturing a lens system according to a lens system design having lens system design parameters and design focal length, said method comprising:

(i) obtaining a starting point lens system design having a plurality of lens components and at least one airspace between two of lens component of said plurality of lens components;

(ii) analyzing said starting point design by
changing values of lens system design parameters by a specified incremental value to change the design focal length and aberrations;
determining for each individual parameter what are the contributions to focal length change and aberrations due to said lens system design parameter value change;
finding a "compensatory" parameter that can be most easily adjusted in assembly environment and to whose change the focal length is sensitive to;

(iii) determining how many of the parameter changes can be compensated by the adjustment in the value of said compensating parameter so that both the focal length change and that the aberrations introduced by these changes are compensated by an adjustment in value of said compensatory parameter;

(iv) if less than 60% of parameter changes can be compensated by the adjustment in the value of said compensating parameter, then finding at least one parameter that has a potential to be influenced by the change in said compensatory parameter and targeting that parameter so that during an optimization the parameter change will introduce the aberration of the appropriate sign so that a change in said compensatory parameter can take it out;

(v) optimizing said starting point design until at least 60% of parameters that can be compensated aberration-wise and for the focal length by a single change to the compensatory parameter;

(vi) obtaining a lens system design characterized by a plurality of design parameters; and (vii) producing the lens system corresponding to said lens system design.

13. A lens system manufactured by the method of claim 12.

14. A method of claim 12, wherein said compensatory parameter is an airspace distance.

* * * * *